US012785062B2

(12) United States Patent
Ahn et al.

(10) Patent No.: US 12,785,062 B2
(45) Date of Patent: Nov. 3, 2026

(54) ELECTRODE ROLLING APPARATUS AND ELECTRODE ROLLING METHOD

(71) Applicant: LG Chem, Ltd., Seoul (KR)

(72) Inventors: Sangbum Ahn, Daejeon (KR); Hwan Han Kim, Daejeon (KR); Ho Kyung Lee, Daejeon (KR); Jeong Soo Seol, Daejeon (KR); Soohyung Hong, Daejeon (KR); Donggi Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 967 days.

(21) Appl. No.: 17/794,402

(22) PCT Filed: Nov. 30, 2021

(86) PCT No.: PCT/KR2021/017912
§ 371 (c)(1),
(2) Date: Jul. 21, 2022

(87) PCT Pub. No.: WO2022/119285
PCT Pub. Date: Jun. 9, 2022

(65) Prior Publication Data
US 2023/0061588 A1 Mar. 2, 2023

(30) Foreign Application Priority Data
Dec. 4, 2020 (KR) ........................ 10-2020-0168504

(51) Int. Cl.
*H01M 4/04* (2006.01)

(52) U.S. Cl.
CPC ....... *H01M 4/0435* (2013.01); *H01M 4/0471* (2013.01)

(58) Field of Classification Search
CPC ............. H01M 4/0404; H01M 4/0435; H01M 4/0471; Y10T 29/49108; H05B 6/10;
(Continued)

(56) References Cited

U.S. PATENT DOCUMENTS 10,880,958 B2 * 12/2020 Umetsu .................... H05B 6/42
2008/0233476 A1 9/2008 Jeong
(Continued)

FOREIGN PATENT DOCUMENTS

CN 101997108 A 3/2011
CN 102113151 A 6/2011
(Continued)

OTHER PUBLICATIONS

JP-2007305322-A translation from FIT database (Year: 2025).*
(Continued)

*Primary Examiner* — Thomas J Hong
*Assistant Examiner* — Joshua D Anderson
(74) *Attorney, Agent, or Firm* — Lerner David LLP

(57) ABSTRACT

An electrode rolling apparatus for rolling an electrode substrate having a coated portion and an uncoated portion includes: a coil section having an effective region where a uniform magnetic field is generated; and an electrode rolling portion for rolling the electrode substrate, wherein the coil section comprises a coil unit disposed on at least one side of opposing sides of the electrode substrate in reference to a traveling direction of the electrode substrate, wherein the coil unit comprises a first coil unit and a second coil unit that are disposed on first and second opposing part of the electrode substrate, respectively and wherein the coil unit is configured to inductively heats an entire region of the uncoated portion and a partial region of the coated portion that are located on the opposing sides centering on a boundary line between the coated portion and the uncoated portion.

10 Claims, 7 Drawing Sheets

(58) Field of Classification Search
CPC .......... H05B 6/101; H05B 6/36; H05B 6/362; H05B 6/40; H05B 6/44; B05D 3/0281; B05C 9/14
See application file for complete search history.

(56) References Cited

U.S. PATENT DOCUMENTS

| | | | | |
|---|---|---|---|---|
| 2010/0264133 | A1 | 10/2010 | Jeong et al. | |
| 2011/0039138 | A1 | 2/2011 | Jeong et al. | |
| 2011/0289790 | A1 | 12/2011 | Kazama et al. | |
| 2012/0288756 | A1 | 11/2012 | Kim | |
| 2020/0156128 | A1 * | 5/2020 | Yoo | H05B 1/023 |
| 2021/0104719 | A1 | 4/2021 | Oikawa | |

FOREIGN PATENT DOCUMENTS

| | | | | | |
|---|---|---|---|---|---|
| EP | 2311120 | A1 | | 4/2011 | |
| JP | 2004127799 | A | | 4/2004 | |
| JP | 2004327203 | A | * | 11/2004 | F26B 13/007 |
| JP | 2004335374 | A | * | 11/2004 | |
| JP | 2007305322 | A | * | 11/2007 | |
| JP | 2008235251 | A | | 10/2008 | |
| JP | 2010027470 | A | | 2/2010 | |
| JP | 2010067579 | A | * | 3/2010 | |
| JP | 4954585 | B2 | | 6/2012 | |
| JP | 5042909 | B2 | | 10/2012 | |
| JP | 2017070984 | A | | 4/2017 | |
| KR | 20100116027 | A | | 10/2010 | |
| KR | 20110038100 | A | | 4/2011 | |
| KR | 20120126303 | A | | 11/2012 | |
| KR | 20140032897 | A | | 3/2014 | |
| KR | 101423832 | B1 | | 7/2014 | |
| KR | 101940887 | B1 | | 1/2019 | |
| KR | 20200006816 | A | | 1/2020 | |
| WO | 2010015908 | A1 | | 2/2010 | |
| WO | 2019239988 | A1 | | 12/2019 | |

OTHER PUBLICATIONS

JP-2004327203-A translation from FIT database (Year: 2026).*
JP-2004335374-A translation from FIT database (Year: 2026).*
JP-2010067579-A translation from FIT database (Year: 2026).*
Extended European Search Report including Written Opinion for Application No. 21900973.5 dated Jul. 13, 2023, pp. 1-7.
International Search Report for Application No. PCT/KR2021/017912 mailed Mar. 4, 2022, pp. 1-3.

* cited by examiner

ELECTRODE ROLLING APPARATUS AND ELECTRODE ROLLING METHOD

CROSS-REFERENCE TO RELATED APPLICATIONS

The present application is a national phase entry under 35 U.S.C. § 371 of International Application No. PCT/KR2021/017912, filed on Nov. 30, 2021, which claims priority from Korean Patent Application No. 10-2020-0168504 filed on Dec. 4, 2020 with the Korean Intellectual Property Office, the disclosure of which is incorporated herein by reference.

TECHNICAL FIELD

The present disclosure relates to an electrode rolling apparatus and an electrode rolling method, and more particularly, to an electrode rolling apparatus and an electrode rolling method having improved electrode defects.

BACKGROUND

The secondary battery can be formed by inserting an electrode assembly composed of a cathode plate, an anode plate, and a separator into a case, and then sealing the case. A cathode plate or an anode plate (hereinafter, referred to as “electrode plate”) can be configured by coating an active material slurry onto a cathode current collector or an anode current collector to a predetermined thickness, interposing a separator between the cathode current collector and the anode current collector, and winding the plate in a jelly-roll shape many times or laminating it in a plurality of layers to form an electrode assembly.

The electrode plate may be formed of an active material-coated portion coated with an active material slurry and an uncoated portion not coated with an active material slurry. The active material-coated portion can include a rolling process that increases the adhesiveness to the electrode current collector and increases the volume density of the active material. The rolled electrode plate can be used by passing through a cutter having a certain width after drying and cutting into a predetermined size.

The rolling process has a problem that a compression deviation occurs due to a difference in thickness between the coating portion and the uncoated portion at the time of rolling the electrode plate. Due to such a deviation, unbalanced plastic deformation of the electrode current collector may occur, thereby causing a residual stress. In particular, the tensile residual stress may cause a reduction of fatigue durability and a reduction of fracture strength of components.

FIG. 1 is a schematic diagram showing a rolling process using a conventional rolling device. FIG. 2 is a plan view showing an electrode plate after rolling.

Referring to FIG. 1, a rolling process of rolling a coated portion 30 and an uncoated portion 40 formed on an electrode current collector 20 by a rolling roll 10 may be performed. At this time, the pressure is concentrated on the coated portion 30, and as shown in FIG. 2, a difference occurs between the degree of stretching of the coated portion 30P and the degree of stretching of the uncoated portion 40, and wrinkles may be generated in the uncoated portion 40. Due to the wrinkles of the uncoated portion 40 generated during rolling, process defects such as electrode disconnection may occur in a subsequent process. In particular, while a high tensile residual stress remains at a boundary surface between the coated portion 30P and the uncoated portion 40, they can continuously endure stress due to the contraction and expansion of the electrode, and may become vulnerable to fracture.

DETAILED DESCRIPTION OF THE INVENTION

Technical Problem

It is an object of the present disclosure to provide an electrode rolling apparatus and an electrode rolling method having improved electrode defects.

However, the technical problem to be solved by embodiments of the present disclosure is not limited to the above-described problems, and can be variously expanded within the scope of the technical idea included in the present disclosure.

Technical Solution

According to one aspect of the present disclosure, there is provided an electrode rolling apparatus for rolling an electrode substrate having a coated portion and an uncoated portion, the apparatus comprising: a coil section having an effective region where a uniform magnetic field is generated; and an electrode rolling portion for rolling the electrode substrate, wherein the coil section comprises a coil unit disposed on at least one side of both sides in reference to the traveling direction of the electrode substrate, wherein the coil unit comprises a first coil unit and a second coil unit that are disposed on the upper part and the lower part of the electrode substrate, respectively, and wherein the coil unit inductively heats an entire region of the uncoated portion and a partial region of the coated portion that are located on both sides centering on the boundary line between the coated portion and the uncoated portion.

The effective region where a magnetic field is generated by the coil section may include the uncoated portion, a partial region of the coated portion adjacent to the uncoated portion, and an air region deviating from one side of the uncoated portion separated from the coated portion.

A magnetic core may be formed in each of the first coil unit and the second coil unit corresponding to the effective region.

The magnetic core may correspond to the uncoated portion and a partial region of the coated portion adjacent to the uncoated portion.

The coil section may further include a connection unit that electrically connects the first coil unit and the second coil unit, and the connection unit may extend in a direction perpendicular to the surface of the electrode substrate.

A current may enter the first coil unit, a current may flow out of the first coil unit into the second coil unit, and a rotation direction of current flow of the first coil unit and a rotation direction of current flow of the second coil unit may be the same as each other.

According to another aspect of the present disclosure, there is provided an electrode rolling method for rolling an electrode substrate including an electrode current collector layer and a coated portion formed on one surface or both surfaces of the electrode current collector layer using a rolling roll, the method comprising the steps of: inductively heating the electrode substrate; and rolling the electrode substrate, wherein the step of inductively heating the electrode substrate includes inductively heating an entire region of the uncoated portion and a partial region of the coated portion that are located on both sides centering on the boundary line between the coated portion and the uncoated portion, and wherein the coil section comprises a first coil unit and a second coil unit that are disposed on the upper part and the lower part of the electrode substrate, respectively.

The step of inductively heating the electrode substrate may be performed before and/or after the step of rolling the electrode substrate.

The step of inductively heating the electrode substrate may form a magnetic field in a vertical direction between the first coil unit and the second coil unit.

The effective region where a magnetic field in a vertical direction is formed may include the uncoated portion, a partial region of the coated portion adjacent to the uncoated portion, and an air region deviating from one side of the uncoated portion separated from the coated portion.

Advantageous Effects

According to embodiments of the present disclosure, both surfaces of the electrode are inductively heated, and the uncoated portion and other portion are heated in an effective region with a uniform magnetic field, thereby capable of minimizing the deviation in the stretching ratio between the coated portion and the uncoated portion in the electrode rolling process.

The effects of the present disclosure are not limited to the effects mentioned above and additional other effects not described above will be clearly understood from the description of the appended claims by those skilled in the art.

DETAILED DESCRIPTION OF THE EMBODIMENTS

Figure 1:
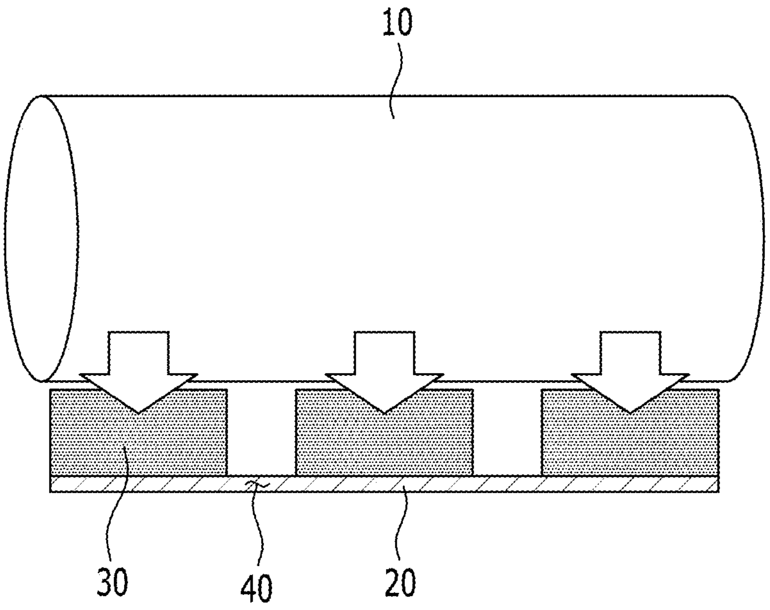
FIG. 1 is a schematic diagram showing a rolling process using a conventional rolling device.
Figure 2:
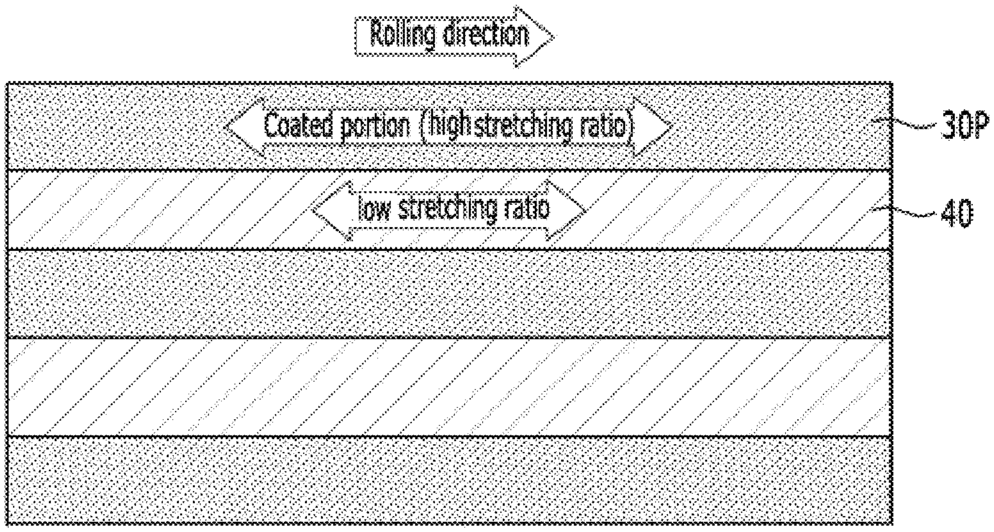
FIG. 2 is a plan view showing an electrode plate after rolling.

Hereinafter, various embodiments of the present disclosure will be described in detail with reference to the accompanying drawings so that they can be easily carried out by those skilled in the art. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Figure 3:
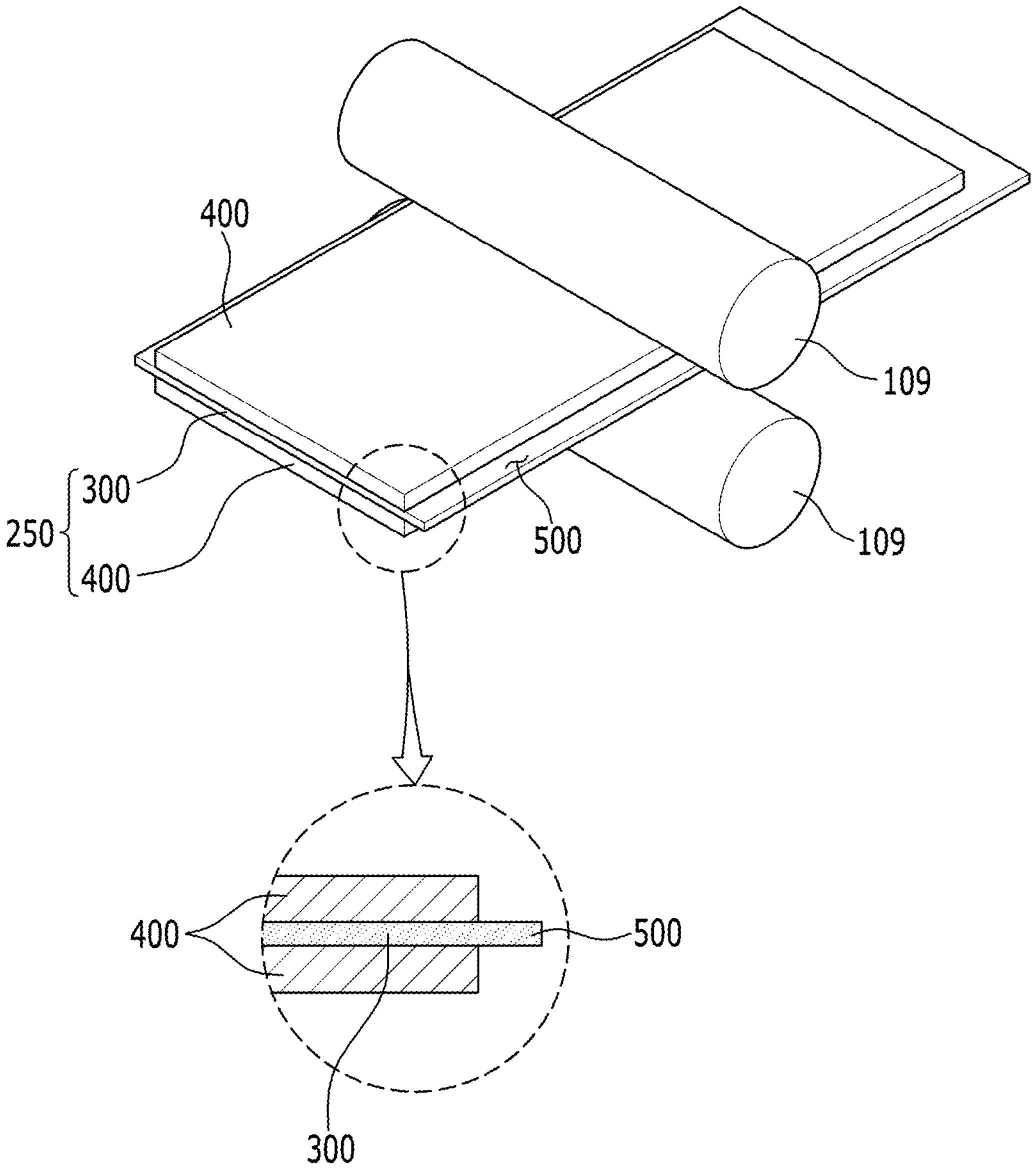
FIG. 3 is a perspective view showing an electrode rolling apparatus according to an embodiment of the present disclosure.
Figure 4:
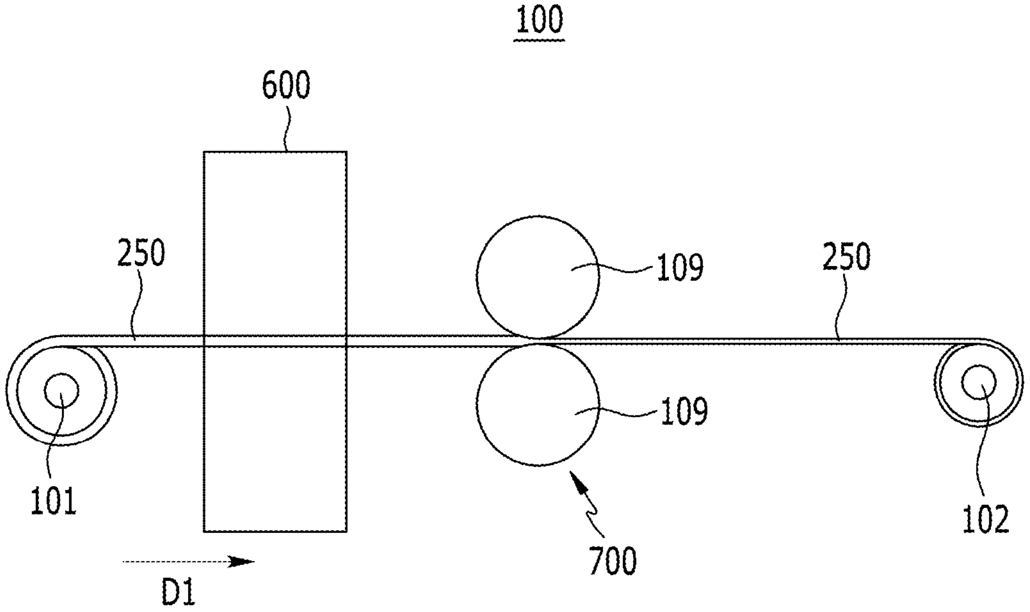
FIG. 4 is a diagram schematically showing a state in which the rolling apparatus of FIG. 3 is viewed from the side surface.

FIG. 3 is a perspective view showing an electrode rolling apparatus according to an embodiment of the present disclosure. FIG. 4 is a diagram schematically showing a state in which the rolling apparatus of FIG. 3 is viewed from the side surface.

Referring to FIG. 3, an electrode rolling method according to one embodiment of the present disclosure includes the steps of: coating an active material onto an electrode current collector layer 300 to form a coated portion 400 and an uncoated portion 500, inductively heating the electrode substrate 250 including the coated portion 400 and the uncoated portion 500 formed on one surface or both surfaces of the electrode current collector layer 300, and rolling the electrode substrate 250.

Referring to FIGS. 3 and 4, the electrode rolling apparatus 100 according to the present embodiment includes a first roller 101 which unwinds an electrode plate 250 having a coated portion 400 on which a coating material is formed on the electrode current collector 300 and an uncoated portion 500 corresponding to a plain portion, a second roller 102 which winds the electrode substrate 250, and a rolling roll 109 which is located between the first roller 101 and the second roller 102 and rolls the coated portion 400 and the uncoated portion 500 of the electrode substrate 250 along the moving direction of the electrode substrate 250. The uncoated portion 500 may refer to a region excluding the coated portion 400 formed on the electrode current collector layer 300.

The first roller 101 provides the electrode substrate 250 to be rolled to the rolling apparatus 100, and moves the electrode substrate 250 in a direction of arrow D1 of FIG. 4 in accordance with a clockwise rotation. The electrode substrate 250 unwound by the first roller 101 passes between the rolling rolls 109 while moving along the direction of the arrow. The rolling rolls 109 are located respectively on both sides in reference to the electrode substrate 250, and the electrode substrate 250 that has passed between the two rolling rolls 109 is pressed. After that, the electrode substrate 250 that has passed between the two rolling rolls 109 is rewound on the second roller 102.

The electrode rolling method according to the embodiment of the present disclosure includes a step of inductively heating the electrode substrate 250 before the electrode substrate 250 having the coated portion 400 and the uncoated portion 500 is unwound and then rolled by the rolling roll 109. The step of inductively heating the electrode substrate 250 can be performed by the coil section 600 located between the first roller 101 and the rolling roll 109 in the electrode rolling apparatus 100 according to the present embodiment. The coil section 600 can apply heat to the uncoated unit 500 according to the present embodiment to reduce a difference in stretching ratio with the coated portion 400. The coil section 600 is located between the rolling roll 109 and the second roller 102 instead of being located between the first roller 101 and the rolling roll 109, so that the electrode substrate 250 can be inductively heated after the rolling process.

Figure 5:
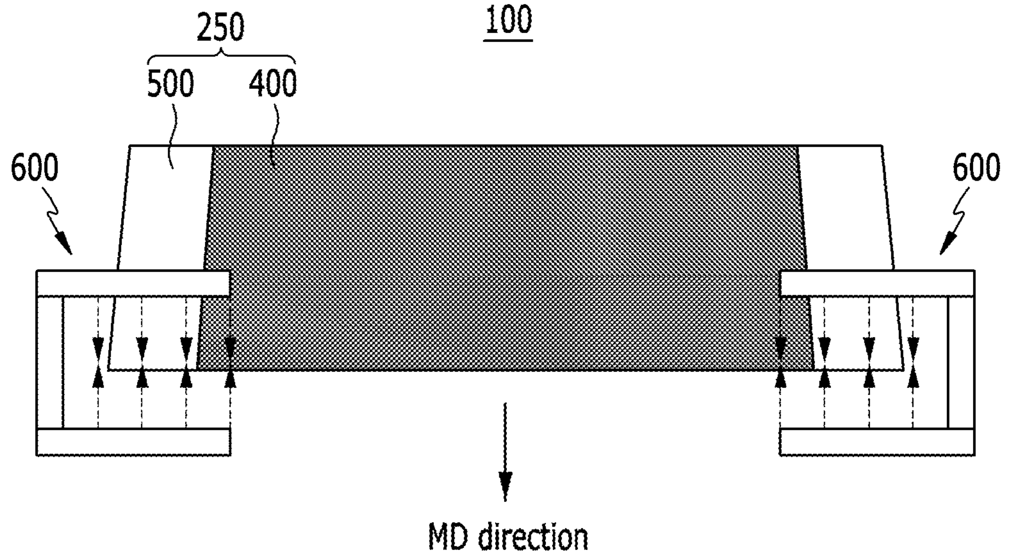
FIG. 5 is a diagram schematically showing a heating portion included in the electrode rolling apparatus of FIG. 4.
Figure 6:
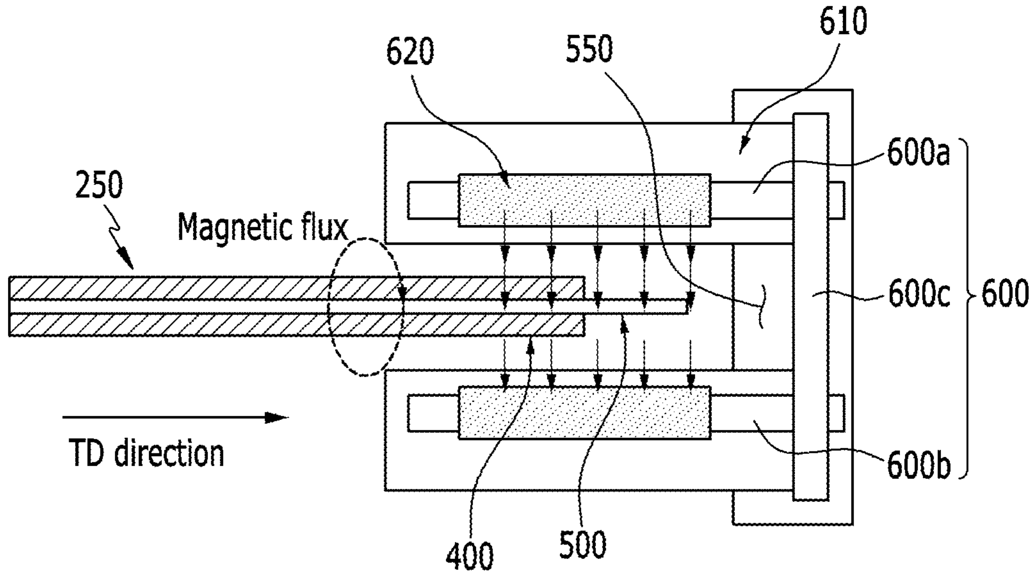
FIG. 6 is a partial view of the electrode rolling apparatus of FIG. 5 as viewed from the front.

FIG. 5 is a diagram schematically showing a heating portion included in the electrode rolling apparatus of FIG. 4. FIG. 6 is a partial view of the electrode rolling apparatus of FIG. 5 as viewed from the front.

Referring to FIGS. 5 and 6, the electrode rolling apparatus 100 according to an embodiment of the present disclosure is an apparatus for rolling an electrode substrate 250 having a coated portion 400 and an uncoated portion 500, the apparatus including a coil section 600 having an effective region in which a uniform magnetic field is generated, and an electrode rolling portion 700 of FIG. 4 for rolling the electrode substrate 250. At this time, the coil section 600 includes a coil unit disposed on at least one side of both sides in reference to the traveling direction (MD direction; the direction in which the rolling roll is wound) of the electrode substrate 250, and the coil unit includes a first coil unit 600*a* and a second coil unit 600*b* that are disposed on the upper part and the lower part of the electrode substrate 250, respectively. The first coil unit 600*a* and the second coil unit 600*b* can be covered by the covering member 610 having insulation and/or heat resistance, respectively.

The effective region in which a magnetic field is generated by the coil section 600 according to the present embodiment includes the uncoated portion 500, a partial region of the coated portion 400 adjacent to the uncoated portion 500, and an air region 550 deviating from one side of the uncoated portion 500 separated from the coated portion 400. A partial region of the coated portion 400 adjacent to the uncoated portion 500, the uncoated portion 500, and an air region 550 deviating from one side of the uncoated portion 500 separated from the coated portion 400 may be sequentially arranged along a direction perpendicular to the direction in which the rolling roll is wound (TD direction).

The coil unit according to the present embodiment can inductively heat an entire region of the uncoated portion 500 and a partial region of the coated portion 400 that are located on both sides centering on the boundary line between the coated portion 400 and the uncoated portion 500. A magnetic core 620 may be formed in each of the first coil unit 600*a* and the second coil unit 600*b* corresponding to the effective region. The magnetic core 620 may correspond to the uncoated portion 500 and a partial region of the coated portion 400 adjacent to the uncoated portion 500.

The magnetic core 620 according to the present embodiment may serve to concentrate the magnetic field from the coil. The magnetic field on the surface of the coil spreads, which causes a difference in the uniformity, but by adjusting the resistance, magnetic permeability, and frequency domain band of the magnetic core 620, or by adjusting the area and position of the magnetic core 620, the region to be heated can be controlled and heated uniformly. Further, a desired magnetic field depth may be adjusted through a combination of different magnetic cores 620.

The coil section 600 according to the present embodiment may further include a connection unit 600*c* that electrically connects the first coil unit 600*a* and the second coil unit 600*b*. The connection unit 600*c* may extend in a direction perpendicular to the surface of the electrode substrate 250.

Figure 7:
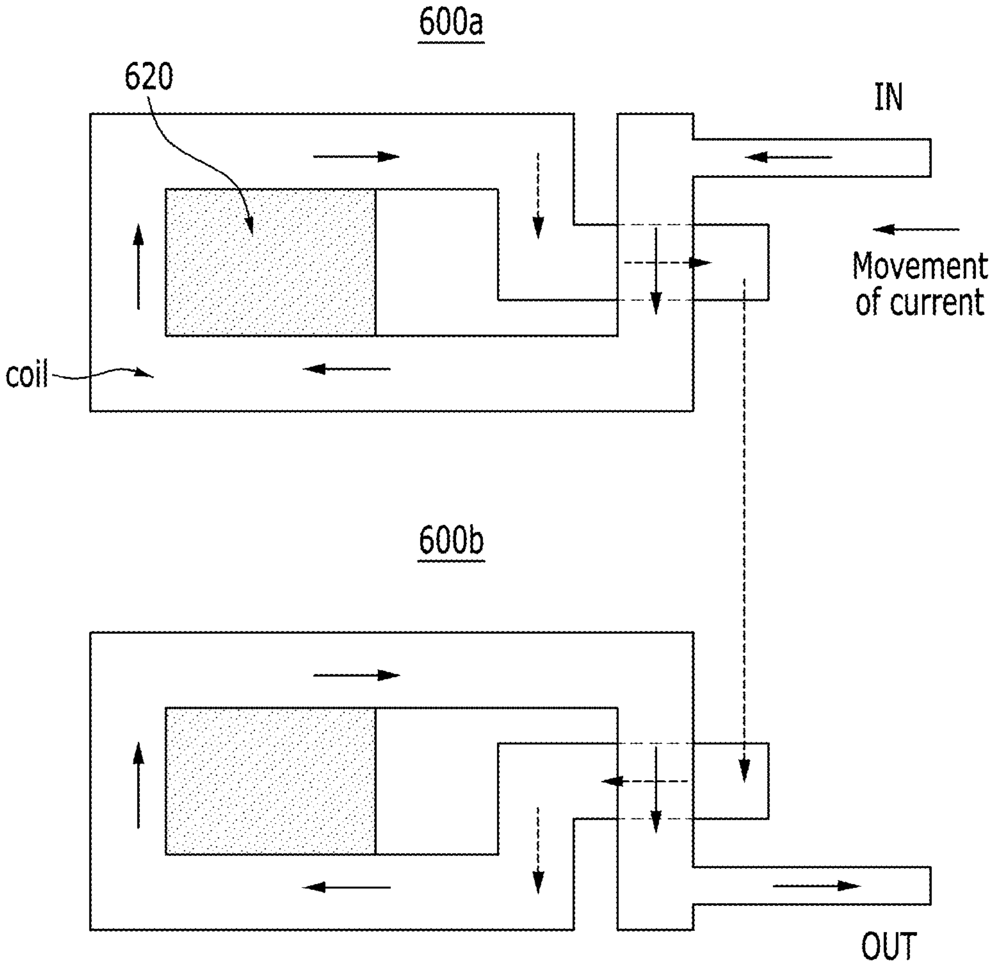
FIG. 7 is a diagram showing a coil section according to an embodiment of the present disclosure.
Figure 8:
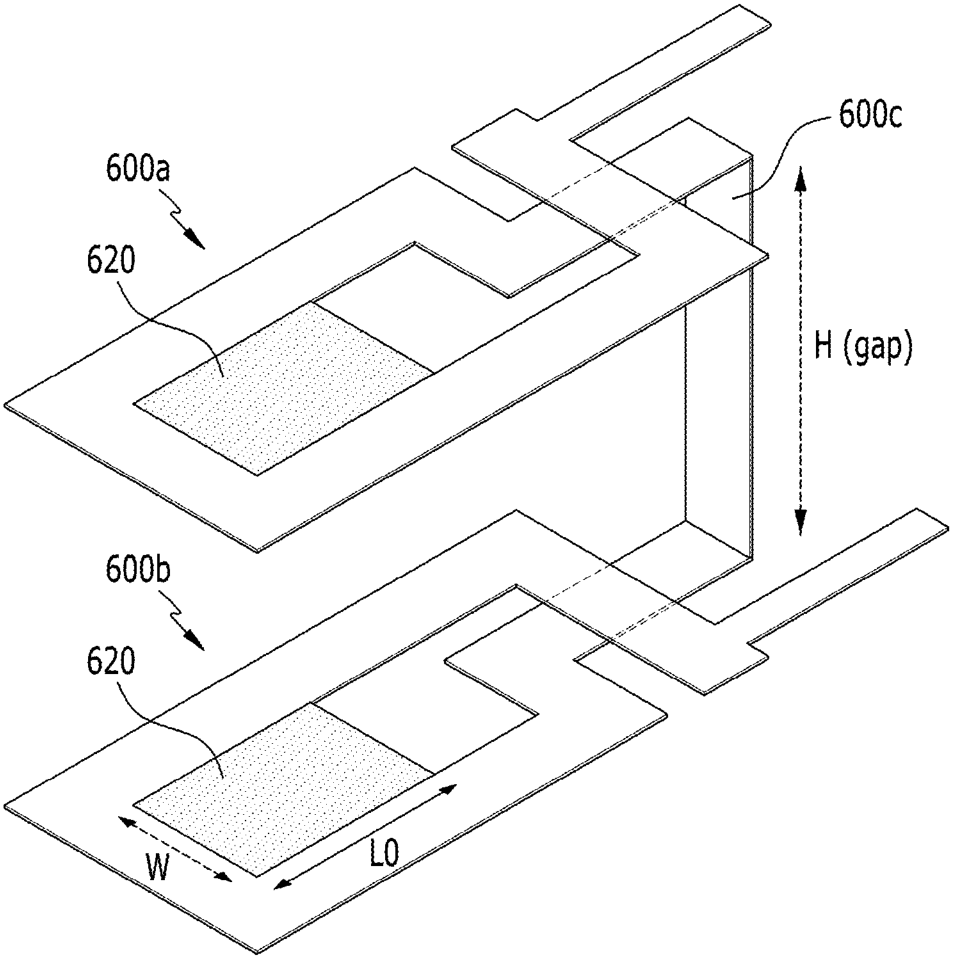
FIG. 8 is a perspective view showing the coil section of FIG. 7.

FIG. 7 is a diagram showing a coil section according to an embodiment of the present disclosure. FIG. 8 is a perspective view showing the coil section of FIG. 7.

Referring to FIGS. 7 and 8, a current may enter the first coil unit 600*a*, and a current may flow out into the second coil unit 600*b*. At this time, the rotation direction of current flow of the first coil unit 600*a* and the rotation direction of current flow of the second coil unit 600*b* may be the same as each other. The current flow can determine the direction of the magnetic field using Fleming's Left-Hand Rule, and if the directions of current flow of the first coil unit 600*a* and the second coil unit 600*b* are different from each other, the magnetic fields are cancelled and the efficiency due to induction heating may decrease.

As shown in FIG. 6, the first coil unit 600*a* and the second coil unit 600*b* may be covered by a covering member 610 having insulation and/or heat resistance, respectively, and a cooling path passing around the coil unit may be formed in the covering member 610. When a current flows through the coil and when an induced current is generated in the opposite direction, heat is generated due to cancellation, and so cooling is needed. Air cooling is also possible, but a solvent such as water cooling may be used for high output and stability.

Figure 9:
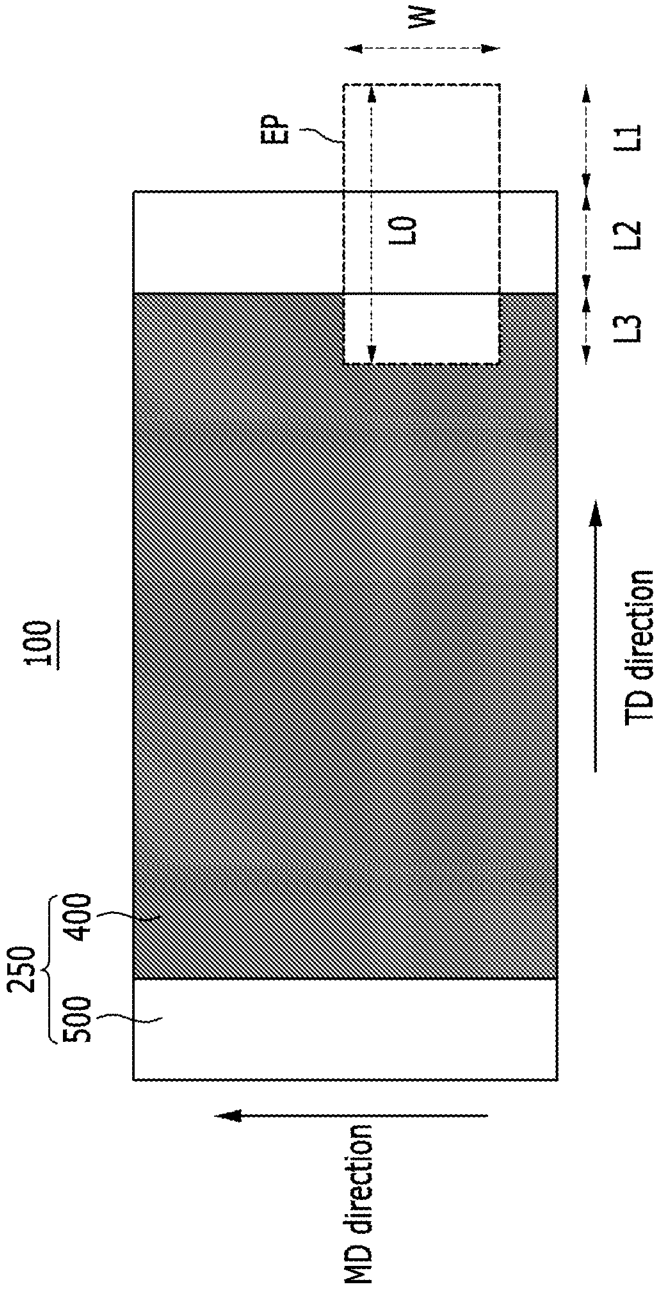
FIG. 9 is a diagram showing a coil effective region in the electrode rolling apparatus according to the present embodiment.

FIG. 9 is a diagram showing a coil effective region in the electrode rolling apparatus according to the present embodiment.

Referring to FIG. 9, the effective region EP according to the present embodiment is a region in which a magnetic field is formed in a vertical direction, and may include the uncoated region L2, the uncoated portion region L2, a partial region L3 of the coated portion adjacent to the uncoated portion region L2, and an air region L1 deviating from one side of the uncoated portion region L2 separated from the coated part region L3. Further, the effective region EP may have a length W in the MD direction, and may adjust the optimal induction heating condition according to a ratio between the TD direction and the MD direction.

According to the present embodiment, the ratio of W/L0 may be in the range of 0.1 to 0.9, preferably in the range of 0.4 to 0.8. At this time, the ratio of the length of the air region L1 to the length L0 of the effective region EP in the TD direction may be greater than 0 and 0.9 or less, preferably greater than 0 and 0.6 or less. The ratio of the length of the uncoated portion region L2 to the length L0 of the effective region EP in the TD direction may be in the range of 0.1 to 1.0, preferably in the range of 0.4 to 0.8. A ratio of the length of the coating area L3 to the length L0 of the effective area EP in the TD direction may be greater than 0 and 0.6 or less, preferably 0.1 to 0.5.

Although preferred embodiments of the present disclosure have been shown and described above, the scope of the present disclosure is not limited thereto, and numerous other variations and modifications can be designed by those skilled in the art using the basic principles of the invention defined in the appended claims, which also fall under the spirit and scope of the invention.

DESCRIPTION OF REFERENCE NUMERALS

100: electrode rolling apparatus
250: electrode substrate

400: coated portion
500: uncoated portion
550: air region
600: coil portion
620: magnetic core
EP: effective region

The invention claimed is:

1. An electrode rolling apparatus for rolling an electrode substrate having a coated portion and an uncoated portion, the apparatus comprising:

a coil section having an effective region where a uniform magnetic field is generated; and an electrode rolling portion configured to roll the electrode substrate, wherein the coil section comprises a first coil unit and a second coil unit each comprising a coil disposed on opposing sides of the electrode substrate in reference to a traveling direction of the electrode substrate, wherein the coil section is configured to inductively heat an entire region of the uncoated portion and a partial region of the coated portion that are located on opposing sides centering on a boundary line between the coated portion and the uncoated portion, wherein the uncoated portion extends in the traveling direction of the electrode substrate, wherein the coil section is configured to inductively heat the uncoated portion to minimize the deviation in the stretching ratio between the coated portion and the uncoated portion, and wherein at least one of the coil units further includes a magnetic core with the coil of the coil unit surrounding an entire periphery of the magnetic core, wherein the coil unit with the magnetic core are configured such that the magnetic field generated by the coil unit extending through the magnetic core is the uniform magnetic field, and wherein the magnetic core defines the effective region of the coil section configured to apply the uniform magnetic field to the entire region of the uncoated portion and the partial region of the coated portion on opposing sides centering on the boundary line between the coated portion and the uncoated portion.

2. The electrode rolling apparatus according to claim 1, wherein:

the effective region of the coil section is further configured to apply the uniform magnetic field to an air region deviating fromadjacent to one side of the uncoated portion and separated from the coated portion.

3. The electrode rolling apparatus according to claim 2, wherein the coil section includes a first magnetic core formed in the first coil unit and a second magnetic core formed in the second coil unit, wherein a position of the first and second magnetic cores corresponds to the effective region.

4. The electrode rolling apparatus according to claim 3, wherein:

the position of the magnetic cores corresponds to the uncoated portion and the partial region of the coated portion on opposing sides centering on the boundary line between the coated portion and the uncoated portion.

5. The electrode rolling apparatus according to claim 1, wherein:

the coil section further comprises a connection unit configured to electrically connect the first coil unit and the second coil unit, and the connection unit extends in a direction perpendicular to an extension direction of each of the first coil unit and the second coil unit.

6. The electrode rolling apparatus according to claim 1, the coil unit is configured such that when a current enters the first coil unit, and the current flows out the first coil unit into the second coil unit, a rotation direction of current flow of the first coil unit and a rotation direction of current flow of the second coil unit are the same.

7. An electrode rolling method for rolling an electrode substrate including an electrode current collector layer, and a coated portion formed on one surface or both surfaces of the electrode current collector layer, using a rolling roll, the method comprising the steps of:

inductively heating the electrode substrate; and rolling the electrode substrate, wherein the step of inductively heating the electrode substrate comprises inductively heating an entire region of an uncoated portion of the electrode current collector layer and a partial region of the coated portion that are located on both sides of the electrode current collector layer centering on the boundary line between the coated portion and the uncoated portion by using a coil section, and wherein the coil section comprises a first coil unit and a second coil unit each comprising a coil that are disposed on a first part of the electrode substrate and a second part of the electrode substrate on an opposing side of the electrode substrate from the first part, respectively, wherein the uncoated portion extends in a traveling direction of the electrode substrate, and wherein the coil section inductively heats the uncoated portion to minimize the deviation in the stretching ratio between the coated portion and the uncoated portion, wherein at least one of the coil units further includes a magnetic core with the coil of the coil unit surrounding an entire periphery of the magnetic core, wherein the coil unit with and the magnetic core are configured such that a magnetic field generated by the coil unit extending through the magnetic core is a uniform magnetic field, and wherein the magnetic core defines an effective region of the coil section configured to apply the uniform magnetic field to the entire region of the uncoated portion and the partial region of the coated portion that are located on opposing sides centering on the boundary line between the coated portion and the uncoated portion.

8. The electrode rolling method according to claim 7, wherein:

the step of inductively heating the electrode substrate is performed before and/or after the step of rolling the electrode substrate.

9. The electrode rolling method according to claim 7, wherein:

the step of inductively heating the electrode substrate forms the uniform a magnetic field in a vertical direction between the first coil unit and the second coil unit.

10. The electrode rolling method according to claim 7, wherein:

the effective region of the coil section is further configured to apply the uniform magnetic field to an air region adjacent to one side of the uncoated portion separated from the coated portion.

* * * * *